(12) United States Patent
Kimura

(10) Patent No.: US 10,872,263 B2
(45) Date of Patent: Dec. 22, 2020

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Mitsuo Kimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 16/398,702

(22) Filed: Apr. 30, 2019

(65) Prior Publication Data

US 2019/0347503 A1 Nov. 14, 2019

(30) Foreign Application Priority Data

May 11, 2018 (JP) .................................. 2018-092340

(51) Int. Cl.
  *G06K 9/46* (2006.01)
  *G06K 9/34* (2006.01)
  *G06K 9/00* (2006.01)

(52) U.S. Cl.
  CPC ....... *G06K 9/4604* (2013.01); *G06K 9/00463* (2013.01); *G06K 9/344* (2013.01); *G06K 2209/01* (2013.01)

(58) Field of Classification Search
  CPC .. G06K 9/4604; G06K 9/00463; G06K 9/344; G06K 2209/01
  See application file for complete search history.

(56) References Cited

U.S. PATENT DOCUMENTS

| 8,184,155 | B2 | 5/2012 | Ke et al. | |
| 9,754,179 | B2 * | 9/2017 | Hiraga | G06K 9/4604 |
| 2001/0043229 | A1 * | 11/2001 | Nakajima | H04N 1/40062 345/667 |
| 2007/0031063 | A1 * | 2/2007 | Zhou | G06K 9/32 382/284 |
| 2009/0041314 | A1 * | 2/2009 | Vercauteren | G06K 9/00134 382/128 |

(Continued)

FOREIGN PATENT DOCUMENTS

JP 2009020890 A 1/2009

*Primary Examiner* — David F Dunphy
(74) *Attorney, Agent, or Firm* — Rossi, Kimms & McDowell LLP

(57) ABSTRACT

A first derivation unit configured to derive, by performing feature point comparison, first transform information used for coordinate transform between a coordinate system in a whole image obtained by capturing in advance the whole of an object and a coordinate system in a first image obtained by capturing the object; a second derivation unit configured to derive, by performing feature point tracking to track position of a feature point extracted from the first image for a plurality of images input sequentially following the first image, second transform information used for coordinate transform between coordinate system of the first image and coordinate system of a second image of the plurality of images; and a third derivation unit configured to derive third transform information used for coordinate transform between coordinate system in the whole image and coordinate system in the second image by combining first transform information and second transform information.

11 Claims, 13 Drawing Sheets

(56) References Cited

U.S. PATENT DOCUMENTS

| | | | |
|---|---|---|---|
| 2014/0294304 A1* | 10/2014 | Madhani | G06K 9/20 |
| | | | 382/182 |
| 2015/0229840 A1* | 8/2015 | Sawai | G06T 3/0068 |
| | | | 348/36 |
| 2017/0134611 A1* | 5/2017 | Thomas | G06K 9/228 |
| 2018/0343354 A1* | 11/2018 | Tsuji | H04N 1/40062 |
| 2019/0005627 A1* | 1/2019 | Nanaumi | G06T 3/00 |

* cited by examiner

| ID | KEY | POINT | WIDTH | HEIGHT |
|---|---|---|---|---|
| 1 | PRODUCT NAME #1 | (100,300) | 100 | 15 |
| 2 | PRODUCT NAME #2 | (100,320) | 100 | 15 |
| 3 | PRODUCT NAME #3 | (100,340) | 100 | 15 |
| 4 | QUANTITY #1 | (220,300) | 35 | 15 |
| 5 | QUANTITY #2 | (220,320) | 35 | 15 |
| 6 | QUANTITY #3 | (220,340) | 35 | 15 |

FIG.6A

Order sheet

Order No. _____  Date of order July 1, 20XX
Order company  XYZ Inc.
Address  1-111 ZZZ town YYY city, XXX prefecture
                080-1234-XXXX                    (seal)

Person in charge  Daijiro Suzuki

We order as follows:

| Model name | Product name | Quantity | Date of deliver |
|---|---|---|---|
| 2801119 | Ink tank_Color_Cyan | 3 | July 3 |
| 3801120 | Ink tank_Color_Black | 3 | July 3 |
| 4801121 | Ink tank_Color_Magenta | 3 | July 3 |
|  |  |  | month / day |
|  |  |  | month / day |
|  |  |  | month / day |
|  |  |  | month / day |
|  |  |  | month / day |

608 — Model name
609 — 2801119
610 — 3801120
611 — Date of deliver
612 — July 3
613 — July 3

Delivery destination

| Destination company name | ABC Inc. | | |
|---|---|---|---|
| Department name | General affairs department | Name of person in charge | Taro Yamada |
| Delivery destination address | 1-111 CCC town BBB city, AAA prefecture | | |
| TEL No. | 222-22-2222 | FAX No. | 111-11-1111 |

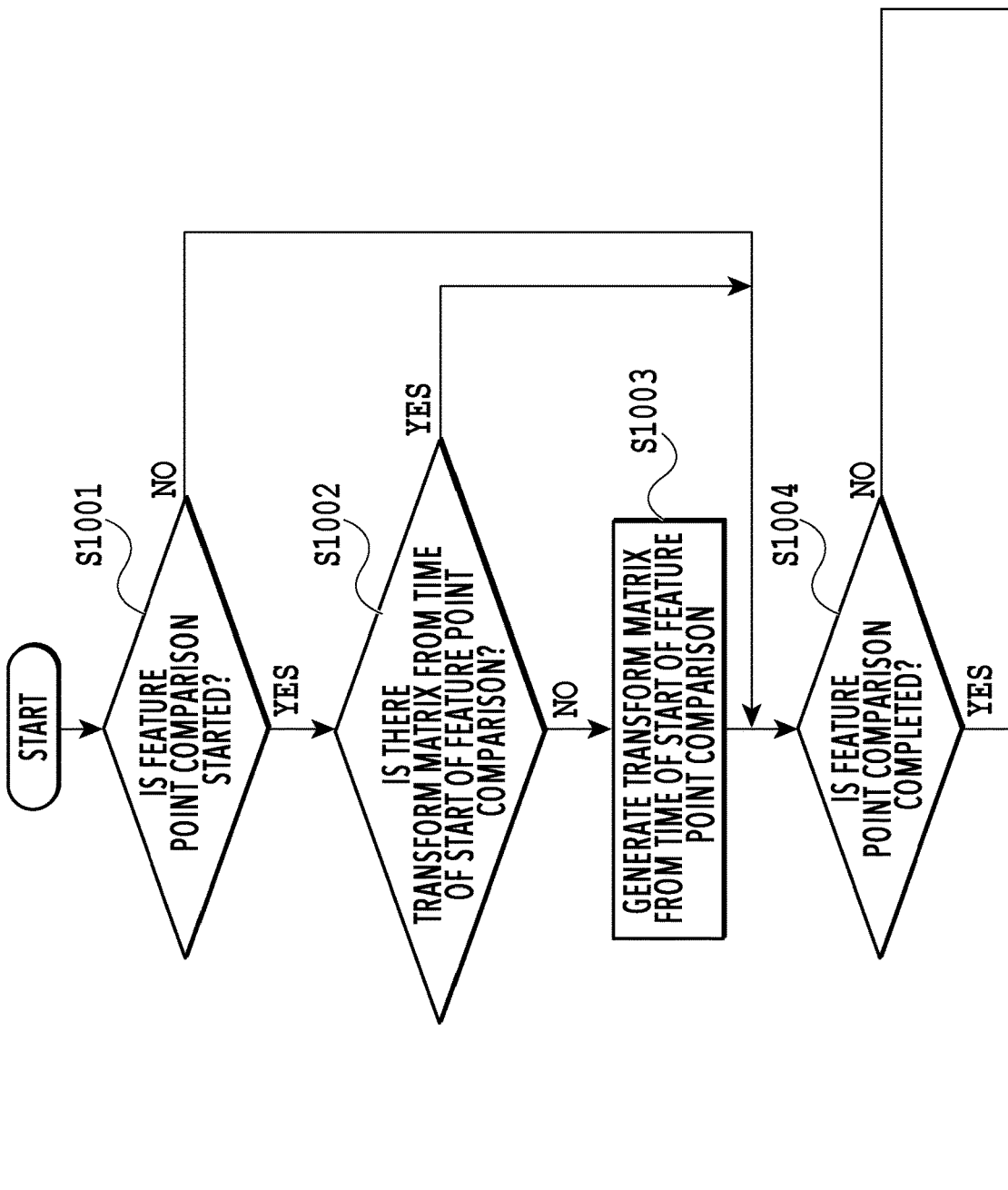

INFORMATION PROCESSING APPARATUS, INFORMATION PROCESSING METHOD AND STORAGE MEDIUM

BACKGROUND OF THE INVENTION

Field of the Invention

The present invention relates to an information processing apparatus that performs tracking processing for images in a plurality of frames.

Description of the Related Art

In recent years, it has been made possible to acquire image data of a paper document with ease by capturing the paper document by using a camera mounted on a mobile terminal. Further, a technique to perform character recognition processing (OCR processing) for an image of a paper document incorporated by a camera has been proposed.

In a case where OCR processing is performed as described above, on a condition that the target is a document whose position coordinates of an area in which information is described (data input area) are already known, for example, such as a business form, it is possible to specify the target area of OCR processing (hereinafter, called OCR processing-target area). However, in a case where the object is a document whose size is comparatively large, such as A4 and A3, on a condition that an attempt is made to perform OCR processing by using an image obtained by capturing the whole of the object, the character recognition accuracy is reduced. The reason is that the resolution of the captured image is reduced because the distance between the target and the camera increases and in addition to this, a detailed portion of the captured image is likely to go out of focus. Consequently, in a case where OCR processing is performed for a document whose size is comparatively large, it is necessary to specify an OCR processing-target area within a document and to perform enlarged image capturing locally by putting a camera close to the area.

Consequently, a method is considered, which prompts a user to perform enlarged image capturing for an OCR processing-target area by specifying the target area from an image obtained by capturing the whole document and highlighting the target area by a red frame or the like. Hereinafter, an image obtained by capturing the whole of an object is called a whole image. It is desirable for the guide display such as this to be continued also while a user is performing the operation to put the camera gradually to the OCR processing-target area in order to perform enlarged image capturing. However, the load of the processing is high, which specifies the current image capturing range by comparing the feature point of the captured image and the feature point of the whole image of the document. Because of this, performing the processing such as this for all the frames during the enlarged image capturing (moving image capturing) is inefficient. Consequently, a method is considered in which the image capturing range is specified by performing feature point comparison processing between the first frame and the whole image of the document and after this, feature point tracking processing to track the amount of movement of the feature point between frames is performed and then the image capturing range and the OCR processing-target area are tracked. Japanese Patent Laid-Open No. 2009-020890 has disclosed a method of estimating the movement of a camera in a plane between video frames (projection transform) by tracking the feature point between video frames after specifying the display area and the position of an electronic document by using the invisible junction feature quantity.

However, with the method described in Japanese Patent Laid-Open No. 2009-020890, an error of the feature point tracking processing between frames accumulates gradually and there is a possibility that the tracking error (position deviation) of the OCR processing-target area becomes large. Consequently, information that is originally necessary goes out of the OCR processing-target area, and therefore, there is a possibility that it is no longer possible to acquire such information. Because of this, in a case where the guide display as described above is performed, it is necessary to track the OCR processing-target area with a high accuracy.

Consequently, an object of the present invention is to propose an information processing apparatus capable of improving the accuracy of tracking processing for images in a plurality of frames.

SUMMARY OF THE INVENTION

The information processing apparatus according to the present invention includes: a first derivation unit configured to derive, by performing a feature point comparison to compare a feature point extracted from a whole image obtained by capturing in advance the whole of an object and a feature point extracted from a first image obtained by capturing the object, first transform information used for coordinate transform between a coordinate system in the whole image and a coordinate system in the first image; a second derivation unit configured to derive, by performing a feature point tracking to track a position of a feature point extracted from the first image for a plurality of images input sequentially following the first image, second transform information used for coordinate transform between a coordinate system of the first image and a coordinate system of a second image of the plurality of images; and a third derivation unit configured to derive third transform information used for coordinate transform between a coordinate system in the whole image and a coordinate system in the second image by combining the first transform information and the second transform information.

Further features of the present invention will become apparent from the following description of exemplary embodiments with reference to the attached drawings.

BRIEF DESCRIPTION OF THE DRAWINGS

FIG. 6A and FIG. 6B are diagrams for explaining an area information table in the first embodiment;

FIG. 10 is a diagram showing the relationship of FIG. 10A and FIG. 10B;

FIG. 10A is a flowchart showing an example of transform matrix generation/updating processing.

DESCRIPTION OF THE EMBODIMENTS

[First Embodiment]

Figure 1:
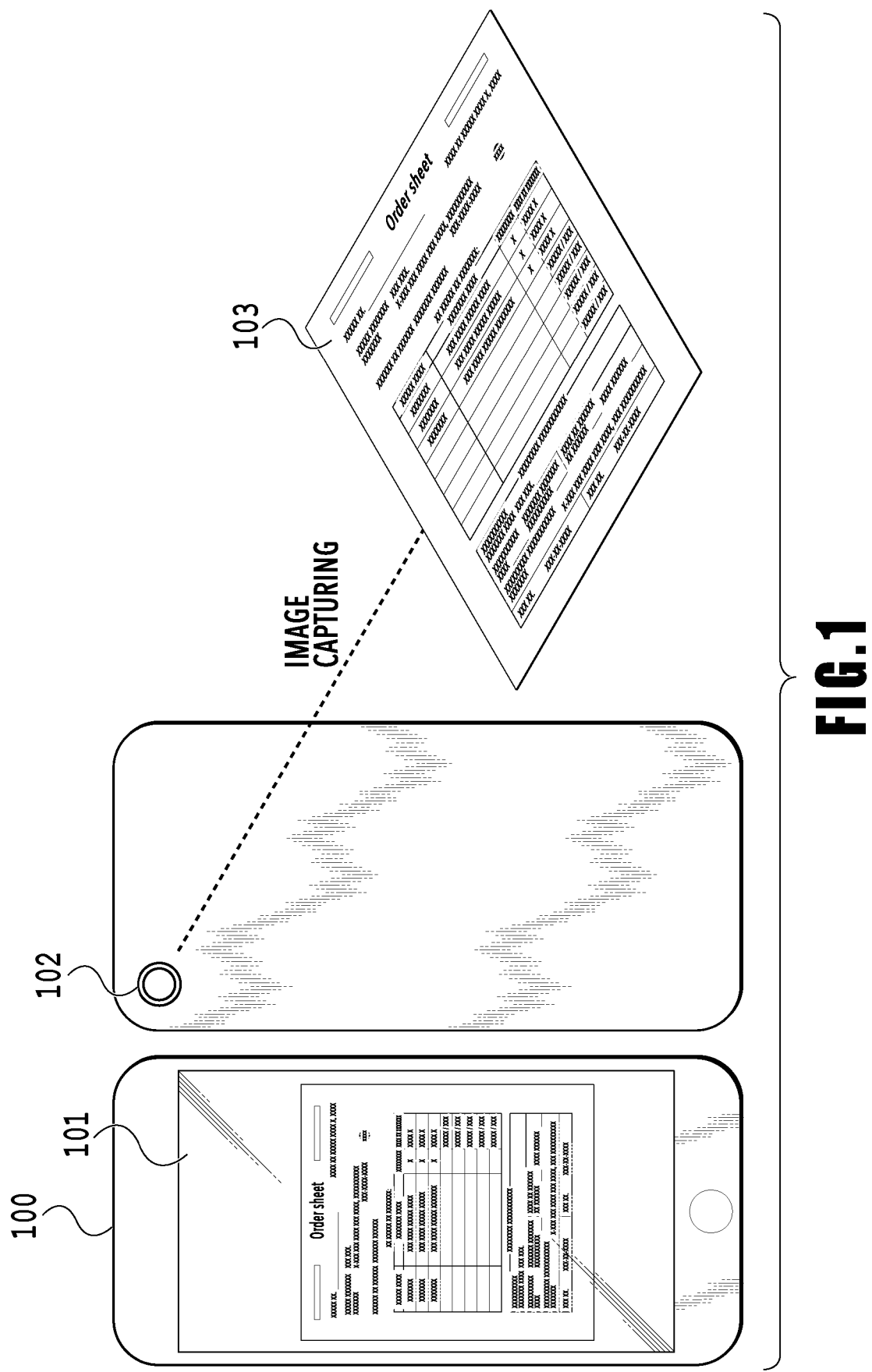
FIG. 1 is a diagram showing an example of an external appearance of an information processing apparatus according to a first embodiment.

FIG. 1 is a diagram showing an example of an external appearance of an information processing apparatus according to a first embodiment. In the present embodiment, as the information processing apparatus, a camera function-attached mobile terminal is taken as an example. In FIG. 1, a front side portion (left diagram) and a backside portion (center diagram) of a mobile terminal 100, and an object 103 (right diagram) are shown. As shown in FIG. 1, on the front side portion of the mobile terminal 100, a touch panel 101 is provided. The touch panel 101 has a function as a display unit configured to display information on an image (moving image) and the like, and a function as in input unit configured to input instructions in accordance with a touch operation of a user. On the backside portion of the mobile terminal 100, a camera 102 that captures the object 103, such as a paper document, and incorporates the captured image is provided. It is possible to start processing by a user of the mobile terminal 100 booting a mobile application, to be described later, and capturing the object 103 by using the camera 102. The object 103 shown in FIG. 1 is an order sheet (paper document) of A4 size. The object 103 is not limited to a paper document and may be name cards, photos, cards, and the like of a variety of sizes. The mobile application outputs (displays) the image (in the present embodiment, moving image) of the object 103 incorporated by the camera 102 to the touch panel 101.

Figure 2:
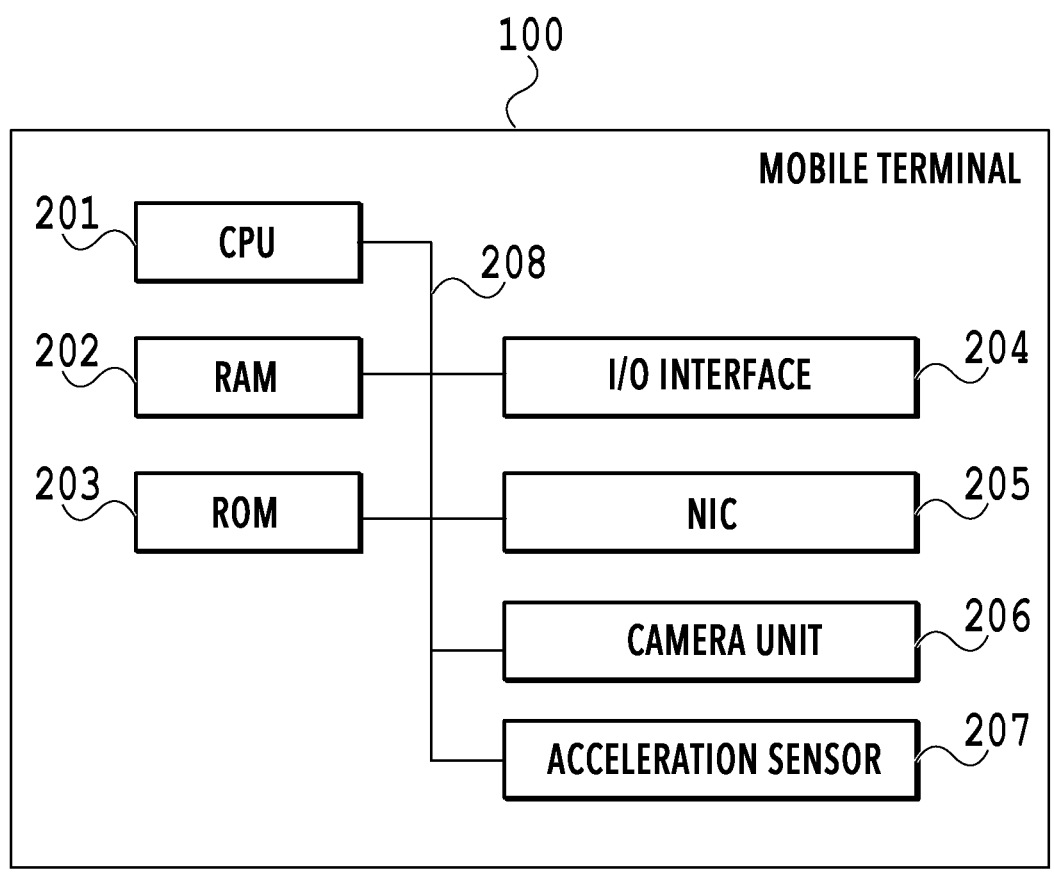
FIG. 2 is a diagram showing an example of a hardware configuration of a mobile terminal.
Figure 3:
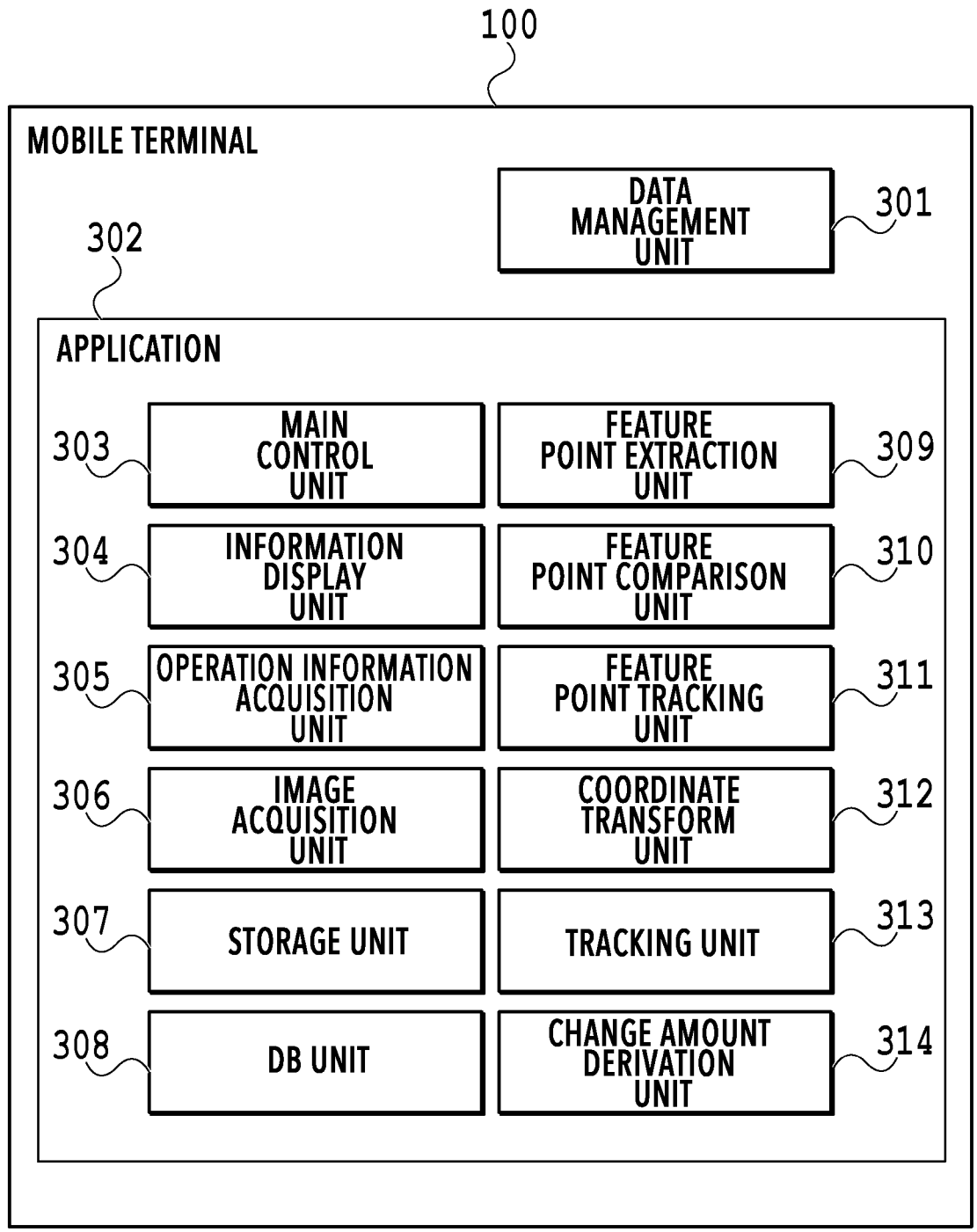
FIG. 3 is a diagram showing an example of a software configuration of the mobile terminal.

FIG. 2 is a diagram showing an example of a hardware configuration of the mobile terminal 100. The mobile terminal 100 has a CPU 201, a RAM 202, a ROM 203, an I/O (Input/Output) interface 204, a NIC (Network Interface Card) 205, a camera unit 206, and an acceleration sensor 207. It is possible for these units to perform transmission and reception of data with one another via a bus 208. The CPU 201 executes various programs and implements a variety of functions. The RAM 202 stores various kinds of information. Further, the RAM 202 is also made use of as a temporary work storage area of the CPU 201. The ROM 203 is a storage medium storing various programs and the like. The ROM 203 is, for example, a flash memory, an SSD (Solid State Disk), and an HDD (Hard Disk Drive). The CPU 201 loads a program stored in the ROM 203 onto the RAM 202 and executes the program. Due to this, the CPU 201 functions as each processing unit of the mobile application as shown in FIG. 3 and performs processing shown in FIG. 9 and FIG. 10A and FIG. 10B, to be described later. It may also be possible to implement all or part of the functions of each processing unit of the mobile application and the processing shown in FIG. 9 and FIG. 10A and FIG. 10B by dedicated hardware. The I/O interface 204 performs transmission and reception of data with the touch panel 101. The NIC 205 is a unit for connecting the mobile terminal 100 to a network (not shown schematically). The camera unit 206 is connected with the camera 102. The camera unit 206 controls the camera 102 and incorporates the image of the object 103 into the mobile terminal 100. At this time, in a case where the camera 102 is performing moving image capturing, images in units of frames are incorporated into the mobile terminal 100. The acceleration sensor 207 is a sensor for measuring acceleration (rate of change of speed) of the mobile terminal 100.

FIG. 3 is a diagram showing an example of a software configuration of the mobile terminal 100. As described above, the program that implements each module (also called function processing unit) in the mobile application shown in FIG. 3 is stored in the ROM 203 or the like. The OS (Operating System) (not shown schematically) of the mobile terminal 100 has a data management unit 301. The data management unit 301 manages images and application data. The OS provides a control API (Application Programming Interface) for making use of the data management unit 301. The mobile application acquires or saves images and application data managed by the data management unit 301 by making use of the control API.

A mobile application 302 is an application installed by making use of the install function of the OS of the mobile terminal 100. It is possible to download the mobile application 302 from, for example, an application store or the like of each OS. The mobile application 302 performs various kinds of data processing for the image (moving image) of the object 103 incorporated via the camera unit 206. The mobile application 302 has a main control unit 303, an information display unit 304, an operation information acquisition unit 305, an image acquisition unit 306, a storage unit 307, and a database (DB) unit 308. Further, the mobile application 302 has a feature point extraction unit 309, a feature point comparison unit 310, a feature point tracking unit 311, a coordinate transform unit 312, a tracking unit 313, and a change amount derivation unit 314.

Figure 4:
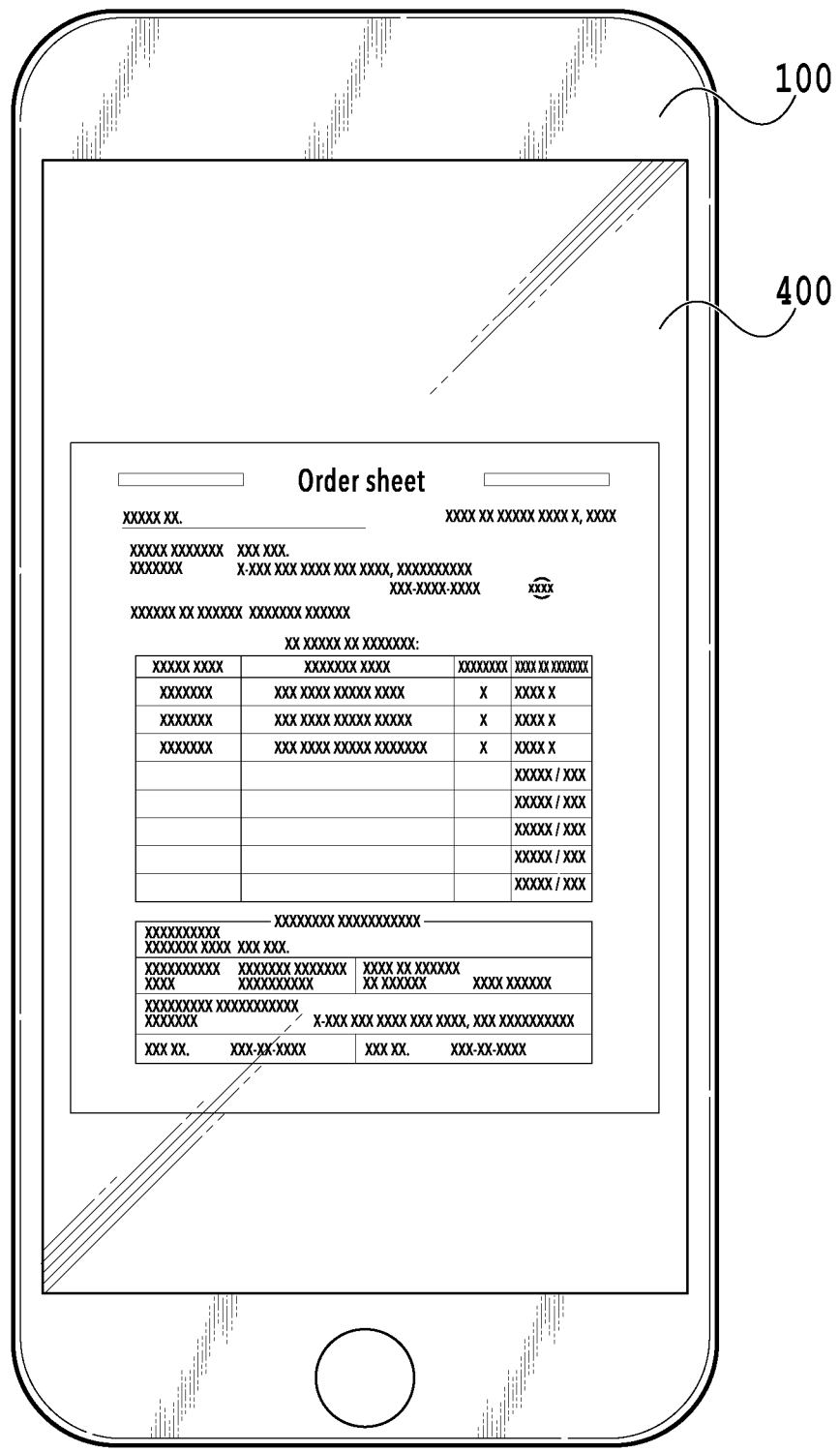
FIG. 4 is a diagram showing an example of a UI screen of a mobile application.

The main control unit 303 controls the other modules 304 to 314 of the mobile application 302. The information display unit 304 displays a user interface (UI) screen of the mobile application 302 on the touch panel 101. FIG. 4 is a diagram showing an example of a UI screen of the mobile application 302. On a UI screen (hereinafter, called mobile terminal screen) 400 shown in FIG. 4, an image (moving image) incorporated by the camera 102 and the camera unit 206 is displayed. Further, the mobile terminal screen 400 receives a user operation (touch operation or the like) for an image or the like. In FIG. 4, an example is shown in which the mobile terminal screen 400 is displayed on the entire surface of the touch panel 101. However, the aspect of the mobile terminal screen 400 (position, size, range, arrangement, display contents, and the like on the touch panel 101) is not limited to the aspect shown in FIG. 4 and it is, possible to adopt an appropriate configuration, which is capable of implementing each piece of processing, to be described later.

The operation information acquisition unit 305 acquires information (hereinafter, called operation information) indicating the contents of the user operation received via the mobile terminal screen 400 and notifies the main control unit 303 of the operation information. For example, in a case where a user touches the mobile terminal screen 400 by his/her hand, the operation information acquisition unit 305 senses the position on the screen touched by the user and transmits information indicating the sensed position to the main control unit 303 by including the information in the operation information.

The image acquisition unit 306 acquires a captured image incorporated by the camera 102 and the camera unit 206 and transmit the captured image to the storage unit 307. The storage unit 307 stores the captured image acquired by the image acquisition unit 306. Further, it is also possible for the storage unit 307 to delete the stored captured image by instructions of the main control unit 303.

The DB unit 308 has a database function and manages a whole image 500, to be described later, and information (OCR processing-target area information table, to be described later) indicating the position or the like of the area to which OCR processing should be applied (OCR processing-target area) in the whole image 500. In the following, there is a case where the OCR processing-target area is represented as a character recognition processing-target area. The data that is managed by the DB unit 308 is transmitted to the storage unit 307 at the time of the main control unit 303 booting the mobile application 302, and read by instructions of the main control unit 303 in accordance with the necessity.

The feature point extraction unit 309 performs feature point extraction processing for the captured image incorporated by the camera 102 and the camera unit 206. More specifically, the feature point extraction unit 309 finds a portion (edge) or the like at which a change in luminance on the image is large as a characteristic pixel point (feature point) and further derives data (feature quantity) representing the feature of the feature point for the image. As a method of finding a feature point and the feature quantity thereof, mention is made of SIFT (Scale-Invariant Feature Transform), SURF (Speeded-Up Robust Features), and the like. The method of finding a feature point and the feature quantity thereof is not limited to the above-described methods, but a method is preferable that is robust to a change, such as rotation, enlargement, and reduction of an image, movement of an image, and the like and in which the matching feature point is determined uniquely in feature point comparison processing, to be described later.

The feature point comparison unit 310 performs feature point comparison processing to compare feature points and feature quantities thereof extracted from each of two different images by the feature point extraction unit 309. In the feature point comparison processing, the feature points and the feature quantities thereof extracted from each image are compared and a combination of feature points that match with each other between the images is found. At this time, by using a method of estimating regularity by excluding outliers, such as RANSAC (Random sample consensus), a combination of feature points, which is a noise, is excluded, and therefore, it is made possible to perform matching with a higher accuracy. However, the processing speed of the feature point comparison processing using the matching method with a high accuracy is generally slow. In the present embodiment, the feature point comparison processing is performed between the whole image of a document (business form or the like) in the already-known format prepared in advance, and the captured image incorporated by the camera 102 and the camera unit 206. In the following, there is a case where the feature point comparison processing is simply represented as a feature point comparison.

The feature point tracking unit 311 extracts a feature point by the feature, point extraction unit 309 from a captured image (original image) in the first frame incorporated by moving image capturing and performs feature point tracking processing to estimate the movement and the position of the feature point on a comparison-target captured image in the second frame. In the feature point tracking processing, a movement vector representing what distance each feature point on the original image moves in which direction on the comparison-target image is estimated. By the processing such as this, it is possible to estimate which position on the comparison-target image the feature point on the original image has moved to. The processing speed of the feature point tracking processing by the feature point tracking unit 311 is higher than the processing speed of the feature point comparison processing by the feature point comparison unit 310. In the following, there is a case where the feature point tracking processing is simply represented as a feature point tracking.

The coordinate transform unit 312 performs mapping of a point by deriving a homography transform matrix (hereinafter, simply called transform matrix) for performing a homography transform (plane projection transform) between two images. Two images are, for example, the whole image and a captured image, or a captured image in the first frame and a captured image in the second frame. It is possible for the homography transform to transform a point on a certain plane coordinate system onto a different plane coordinate system to move the point. As a method similar to the homography transform, there is an affine transform capable of rotation, translation, and enlargement/reduction of an image, but the homography transform is capable of a trapezoidal transform in which the ratio of enlargement/reduction is changed in accordance with the coordinate position in addition thereto. The homography is represented by a mathematical expression as follows by using a coordinate point $(x_1, y_1)$ on the image, which is the source of transform, a coordinate point $(x_2, y_2)$ on the image after the transform, a transform matrix H, and a constant s. The mathematical expression of the transform matrix is not limited to the mathematical expression below and as long as the mathematical expression is a transform expression for transforming coordinate systems of two images, the representation is not limited to that by a matrix expression and it may also be possible to represent the mathematical expression by another representation. The transform expression (transform matrix) such as this is generally used as transform information at the time of transforming coordinate systems of two images.

$$H\begin{pmatrix} x_1 \\ y_1 \\ 1 \end{pmatrix} = \begin{pmatrix} h_{11} & h_{12} & h_{13} \\ h_{21} & h_{22} & h_{23} \\ h_{31} & h_{32} & 1 \end{pmatrix} \begin{pmatrix} x_1 \\ y_1 \\ 1 \end{pmatrix} = \begin{pmatrix} s \cdot x_2 \\ s \cdot y_2 \\ s \end{pmatrix}$$

In a case where a feature point extracted from the object exists in two images, based on the coordinates of the corresponding point between images, which is found by the matching processing of the feature point comparison unit 310 or the feature point tracking unit 311, the parameters of the transform matrix H are derived. Due to this, it is made possible to map coordinates in a first image into a second image by using a transform matrix between two images, or to perform inverse mapping by finding an inverse matrix of the transform matrix. However, in a case where almost no identical object exists between two images (in a case where a difference between images is large), the number of feature points that succeed in matching becomes small, and therefore, there is a possibility that derivation of the transform matrix H will fail. Consequently, in order to accurately derive a movement vector in the feature point tracking processing, it is necessary for the movement amount of an object to be smaller than a predetermined value (a difference between images is small) between two images (a captured image in the first frame and a captured image in the second frame).

The tracking unit 313 tracks which portion (area) of the whole image 500 the most recent captured image incorporated by the camera 102 and the camera unit 206 captures. Then, the tracking unit 313 draws an image by mapping the OCR processing-target area onto the captured image and displays the image on the mobile terminal screen 400 based on the tracking results and information on the OCR processing-target area stored in an OCR processing-target area information table, to be described later. Because of this, it is necessary to wait until the processing to find a transform matrix between the whole image 500 and the most recent captured image by the coordinate transform unit 312 is completed before displaying the image onto which the OCR processing-target area is mapped on the mobile terminal screen 400 after acquiring the most recent image. For derivation of a transform matrix by the coordinate transform unit 312, the matching processing of a feature point between two images is necessary. Then, for the matching processing, there are two derivation methods by the feature point comparison unit 310 and by the feature point tracking unit 311. As described above, the feature point comparison processing by the feature point comparison unit 310 takes time, and therefore, in a case where no image is displayed until the feature point comparison processing is completed, a reduction in the image capturing rate will result. Further, the speed of the feature point tracking processing by the feature point tracking unit 311 is high, but tracking is performed by sequentially multiplying the transform matrix found between each image capturing frame, and therefore, an error of the transform matrix found between each frame accumulates. Consequently, in a case where only the feature point tracking processing by the feature point tracking unit 311 is performed, a deviation will occur gradually in the tracking results. Because of this, as will be described later, in the tracking processing in the present embodiment, tracking is performed while correcting a deviation by performing the feature point comparison processing periodically while performing the feature point tracking processing. By combining the feature point comparison processing and the feature point tracking processing, it is made possible to prevent a reduction in the image capturing rate in drawing onto the mobile terminal screen 400 while keeping a deviation in tracking to a minimum.

The change amount derivation unit 314 performs difference derivation processing to derive a distance and a difference in area between each area obtained by mapping each of successive captured images onto a plane coordinate system of the whole image based on the tracking results by the tracking unit 313. Here, it is assumed that the distance between each area is a distance in a straight line between the center points in each area (centers of four points because the area is a rectangle).

Figure 5A:
FIG. 5A and FIG. 5B are diagrams showing an example of a whole image and captured images of an object.
Figure 5B:
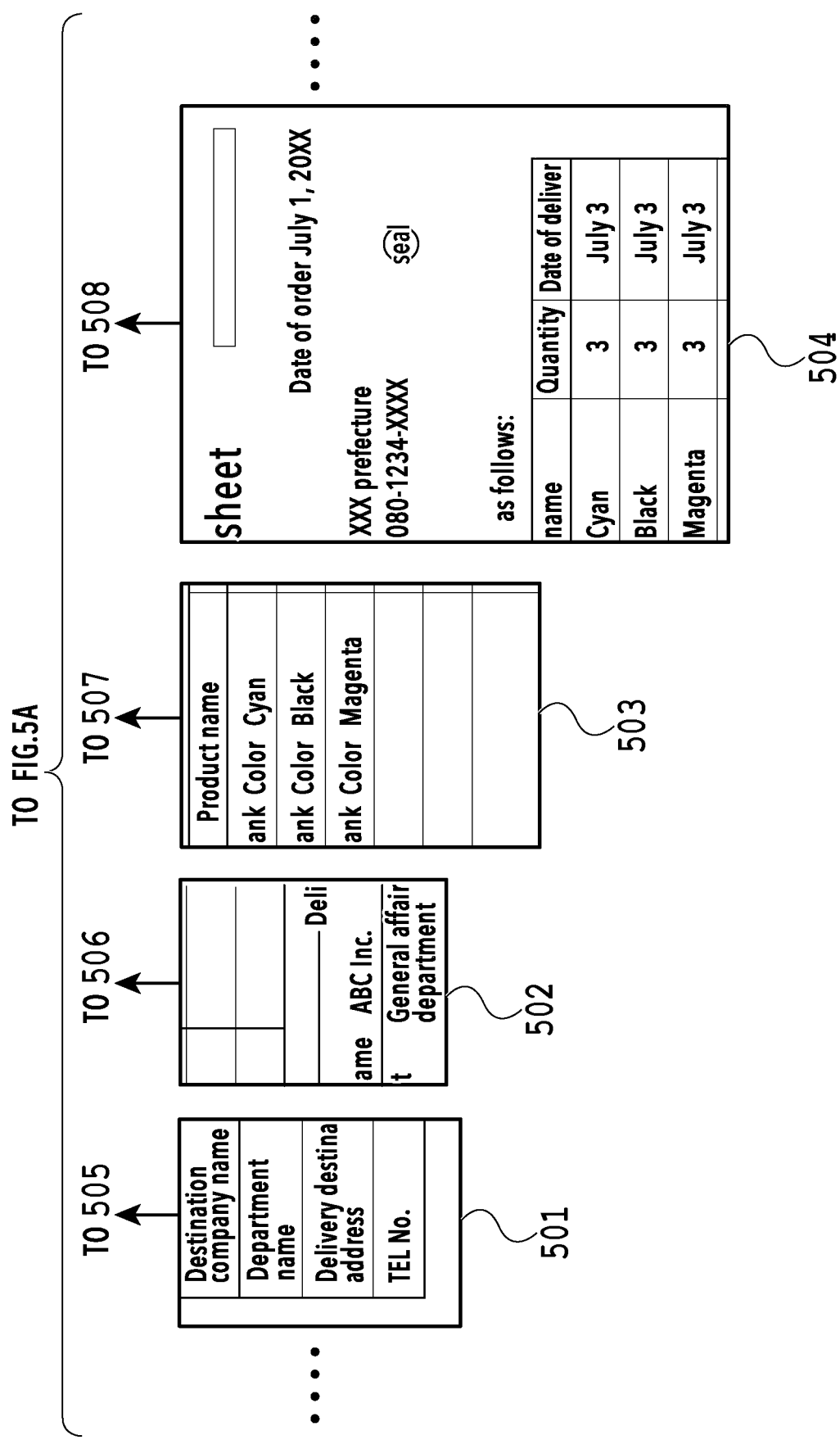

Next, the whole image and a captured image are explained by using FIG. 5A and FIG. 5B. The whole image 500 is an example of a document image prepared in advance. It is assumed that the whole image 500 is image data relating to the whole image of the object 103 and saved in advance in the DB unit 308, but this is not limited. For example, it may also be possible to perform sheet surface detection processing to delete areas other than the object 103 based on the image data acquired by capturing the whole object 103 first. Alternatively, it may also be possible to add a flow to acquire the whole image 500 by performing shaping processing, such as distortion correction processing to correct a distorted portion, to the mobile application 302. Further, the whole image 500 may be a document image in an already-known format including only table frames and fixed character string portions, such as a business form (image before a character string is written in an OCR processing-target area). Captured images 501 to 504 are part of images in a plurality of frames, which are obtained by performing moving image capturing for a part (or whole) of the object 103 by the camera 102. Areas 505 to 508 on the whole image 500 indicate captured areas corresponding to the captured images 501 to 504, respectively. FIG. 5A and FIG. 5B show the way the captured area moves from the area 505 to the area 508 in accordance with the movement of the camera 102.

Next, the OCR processing-target area information table (hereinafter, simply called area information table) stored in the DB unit 308 is explained. FIG. 6A and FIG. 6B are diagrams for explaining the area information table in the first embodiment. In FIG. 6A, an example of a data structure of the area information table is shown. In FIG. 6B, an example of a captured image onto which an OCR processing-target area is mapped is shown. An area information table 601 includes five columns of id, key, point, width, and height. In the id column, a value that increases by 1 each time a record is added to the area information table, that is, a Primary key of Table is stored. The key column indicates what information the data included in the OCR processing-target area is. In the point column, coordinates of the top-left end of the OCR processing-target area in the coordinate system of the whole image 500 are stored. In the width column, information indicating the width (length in the horizontal direction in FIG. 5A) of the OCR processing-target area in units of pixels is stored. In the height column, information indicating the height (length in the vertical direction in FIG. 5A) of the OCR processing-target area in units of pixels is stored. Further, each of broken-line frames 608 to 613 shown schematically on the whole image 500 shown in FIG. 6B indicates the area corresponding to each of records 602 to 607 in the area information table 601. That is, each of the frames 608 to 613 indicates the OCR processing-target area. As shown in FIG. 6B, by mapping information (here, broken-line frame) indicating the OCR processing-target area, it is possible to display the OCR processing-target area as a guide.

Figure 7:
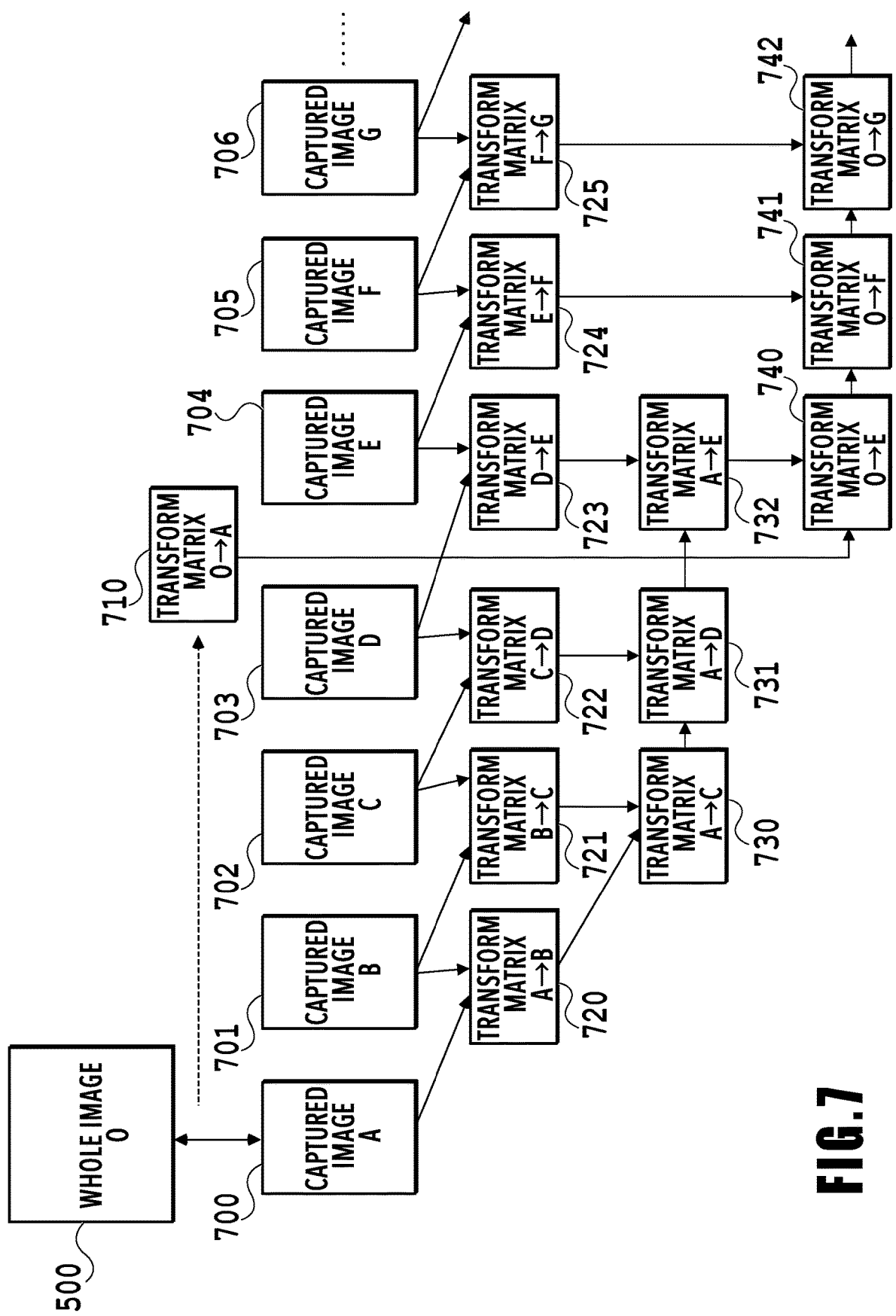
FIG. 7 is a diagram for explaining tracking processing.
Figure 8:
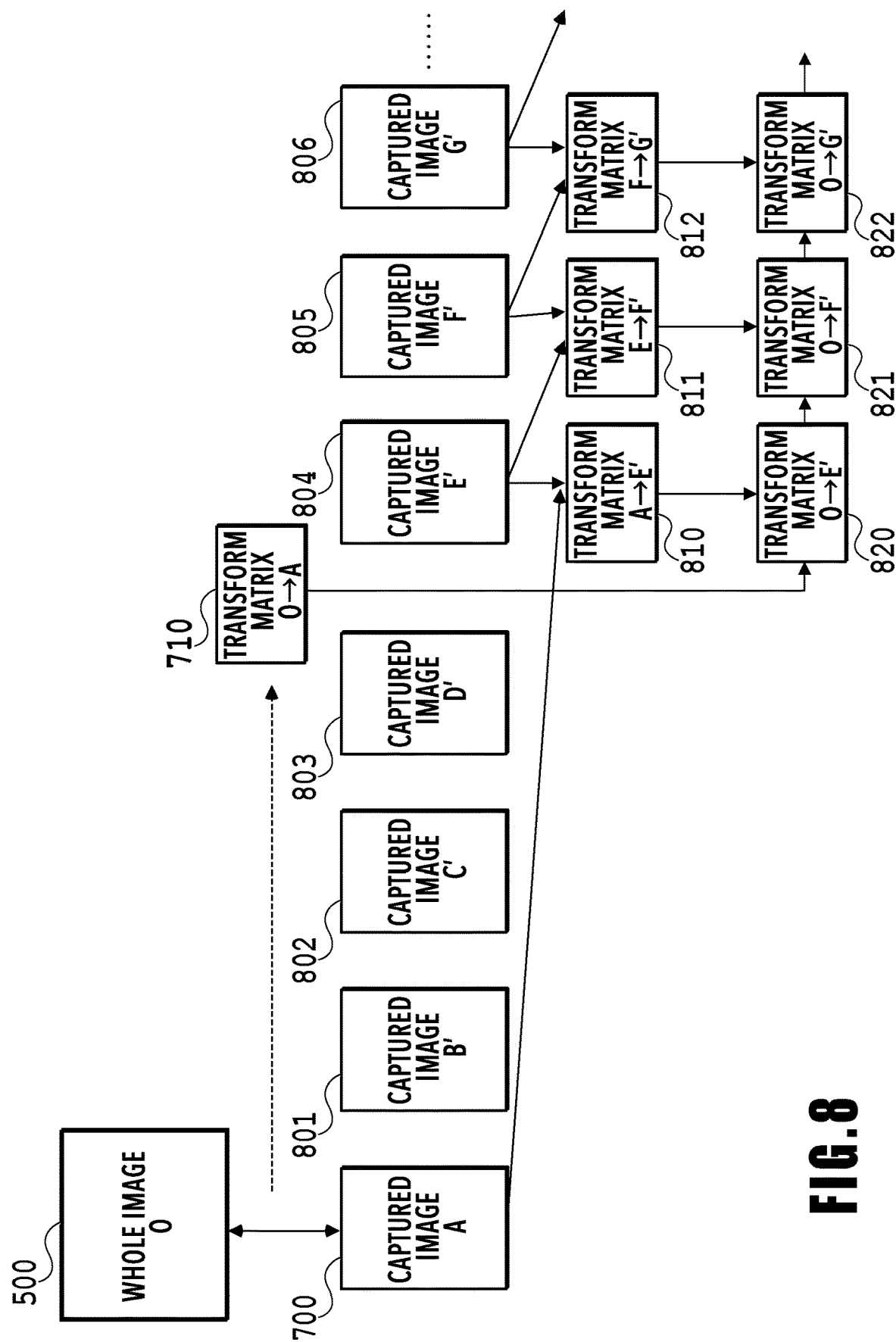
FIG. 8 is a diagram for explaining the tracking processing.

Next, the tracking processing by the tracking unit 313 is explained by using FIG. 7 and FIG. 8. In the following, explanation is given by taking transform information used for coordinate transform between two images as a transform matrix, but as in the case with the transform information used in the coordinate transform unit 312 described previously, the transform information is not limited to a representation of a matrix expression and the transform information may be another transform expression or another piece of transform information. Images 700 to 706 (hereinafter, captured images A to G) shown in FIG. 7 are captured images in successive frames obtained by performing moving image capturing by putting the camera 102 close to the object 103. In FIG. 7 and FIG. 8, time elapses in the rightward direction.

A transform matrix 710 (hereinafter, transform matrix O→A) is found by the coordinate transform unit 312 by taking the whole image 500 (described as captured image O) prepared in advance and the captured image A as input images and by using the results obtained by performing the feature point comparison processing in the feature point comparison unit 310. The processing of the feature point comparison unit 310 takes time, and therefore, before the transform matrix O→A is derived, the captured images B to D, which is a moving image, are acquired.

A transform matrix 720 (hereinafter, transform matrix A→B) is found by the coordinate transform unit 312 by taking the captured image A and the captured image B as input images and by using the results obtained by performing the feature point tracking processing to track the feature point in the feature point tracking unit 311. Similarly, each of transform matrixes 721 to 725 is found by the coordinate transform unit 312 by taking two successive captured images as input images and by using the results obtained by performing the feature point tracking processing to track the feature point in the feature point tracking unit 311.

A transform matrix 730 (hereinafter, transform matrix A→C) is found by combining (multiplying) the transform matrix A→B and the transform matrix 721 (hereinafter, transform matrix B→C) and is a transform matrix that enables the coordinate transform between the captured image A and the captured image C.

A transform matrix 731 (hereinafter, transform matrix A→D) is found by multiplying the transform matrix A→C by the transform matrix C→D and is a transform matrix that enables the coordinate transform between the captured image A and the captured image D. Similarly, a transform matrix 732 (hereinafter, transform matrix A→E) is found by multiplying the transform matrix A→D by the transform matrix 723 (hereinafter, transform matrix D→E) and is a transform matrix that enables the coordinate transform between the captured image A and the captured image E.

At the point in time at which the captured image E is acquired, in a case where derivation of the transform matrix O→A by the coordinate transform unit 312 is completed, at that time in point, generation of a transform matrix O→E that enables the coordinate transform between the whole image O and the captured image E is performed. It is possible to find the transform matrix O→E by multiplying the transform matrix A→E and the transform matrix O→A. The tracking unit 313 draws an image by mapping each OCR processing-target area onto the captured image E based on the transform matrix O→E and the OCR processing-target area information saved in the area information table 601 and displays the image on the mobile terminal screen 400.

Further, after this, it is possible to find a transform matrix 741 (hereinafter, transform matrix O→F) that enables the coordinate transform between the whole image O and the captured image F by multiplying the transform matrix O→E by the transform matrix 724 (hereinafter, transform matrix E→F). Similarly, it is possible to find a transform matrix 742 (hereinafter, transform matrix O→G) that enables the coordinate transform between the whole image O and the captured image G by multiplying the transform matrix O→F by the transform matrix 725 (hereinafter, transform matrix F→G).

After this, by repeating the same processing, a transform matrix between the whole image O and the most recent captured image is found and the most recent captured image drawn by each OCR processing-target area being mapped is displayed on the mobile terminal screen 400.

As described above, in the present embodiment, while feature quantity comparison processing between the whole image and the captured image is being performed, tracking is performed by repeating feature quantity tracking processing between the captured image (feature point comparison image) and the most recent captured image. By the tracking processing such as this, while the feature quantity comparison processing between the whole image O and the feature point comparison image A is being performed, it is possible to find the transform matrix A→E between the feature point comparison image A and the most recent captured image (in the example shown in FIG. 7, the captured image E). Due to this, at the point in time at which the feature quantity comparison processing between the whole image O and the feature point comparison image A is completed, it is possible to find the transform matrix O→E between the whole image O and the most recent captured image E by multiplying the transform matrix O→A found by the feature quantity comparison processing and the transform matrix A→E. However, the accuracy of the transform matrix between the whole image and the most recent captured image is not 100% because of the influence of the estimation error of the feature point tracking processing by the feature point tracking unit 311, and the like. Because of this, as the number of times of multiplication of transform matrixes increases, the error accumulates. Consequently, in the present embodiment, as will be described later, accumulation of the error is reset by periodically performing the tracking processing that starts from the feature quantity comparison processing with the whole image.

In a case where the captured image A is the captured image that is acquired for the first time after the start of image capturing, until the transform matrix O→A is generated, the captured images B to D keep being displayed on the mobile terminal screen 400 as they are. The reason is that it is not possible to find the transform matrix between the whole image O and the most recent captured image, and therefore, it is not possible to find the position of the OCR processing-target area.

On the other hand, in a case where the transform matrix between the whole image O and the captured image has been found by the same tracking processing before the captured image A is acquired, until the transform matrix O→A is found, the transform matrix found previously is used. Due to this, it is made possible to display the most recent captured image drawn by each OCR processing-target area being mapped on the mobile terminal screen 400. Then, at the time in time at which the transform matrix O→E is found, it is possible to reset accumulation of the error of the transform matrix by replacing the transform matrix found previously with the transform matrix O→E. However, the error corresponding to the number of transform matrixes multiplied until the transform matrix O→E is found accumulates, and therefore, it does not mean that the error is reset perfectly.

In the example shown in FIG. 7, in a case where the amount of movement of the camera is small between the captured image A and the captured image E and the difference between the images is small, by finding a transform matrix by performing the feature point tracking processing, it is possible to reset the error perfectly. FIG. 8 is a diagram for explaining the tracking processing in a case where the difference between the captured image A and the most recent captured image is small compared to the example shown in FIG. 7. In FIG. 8, as in the example in FIG. 7, the captured image 700 and captured images 801 to 806 in successive frames obtained by performing moving image capturing by putting the camera 102 close to the object 103 are shown. It is assumed that the captured images 801 to 806 (hereinafter, captured images B' to G') are images different from the captured images B to G shown in FIG. 7 and images whose difference from the captured image A is small.

As in the example shown in FIG. 7, in a case where derivation of the transform matrix O→A by the coordinate transform unit 312 is completed at the point in time at which the captured image E' is acquired, at that point in time, generation of a transform matrix 810 (hereinafter, transform matrix A→E') is performed. The transform matrix A→E' is found by the coordinate transform unit 312 by taking the captured image A and the captured image E' as input images and by using the results obtained by performing the feature point tracking processing in the feature point tracking unit 311. By multiplying the transform matrix O→A and the transform matrix A→E', a transform matrix 820 (hereinafter, transform matrix O→E') between the whole image O and the captured image E' is found. The tracking unit 313 draws an image by mapping each OCR processing-target area onto the captured image E' based on the transform matrix O→E' and the OCR processing-target area information saved in the area information table 601 and displays the image on the mobile terminal screen 400. Similarly, transform matrixes 811 and 812 (hereinafter, transform matrixes E'→F', F'→G') are each found by the coordinate transform unit 312 by taking two successive captured images as input image and by using the results obtained by performing the feature point tracking processing in the feature point tracking unit 311. By multiplying the transform matrix O→E' by the transform matrix E'→F', it is possible to find a transform matrix 821 (hereinafter, transform matrix O→F') between the whole image O and the captured image F'. Similarly, by multiplying the transform matrix O→F' by the transform matrix F'→G', it is possible to find a transform matrix 822 (hereinafter, transform matrix O→G') between the whole image O and the captured image G'.

After this, by repeating the same processing, the transform matrix between the whole image O and the most recent captured image is found and the most recent captured image drawn by each OCR processing-target area being mapped is displayed on the mobile terminal screen 400.

<Flow of Tracking Processing>

Figure 9:
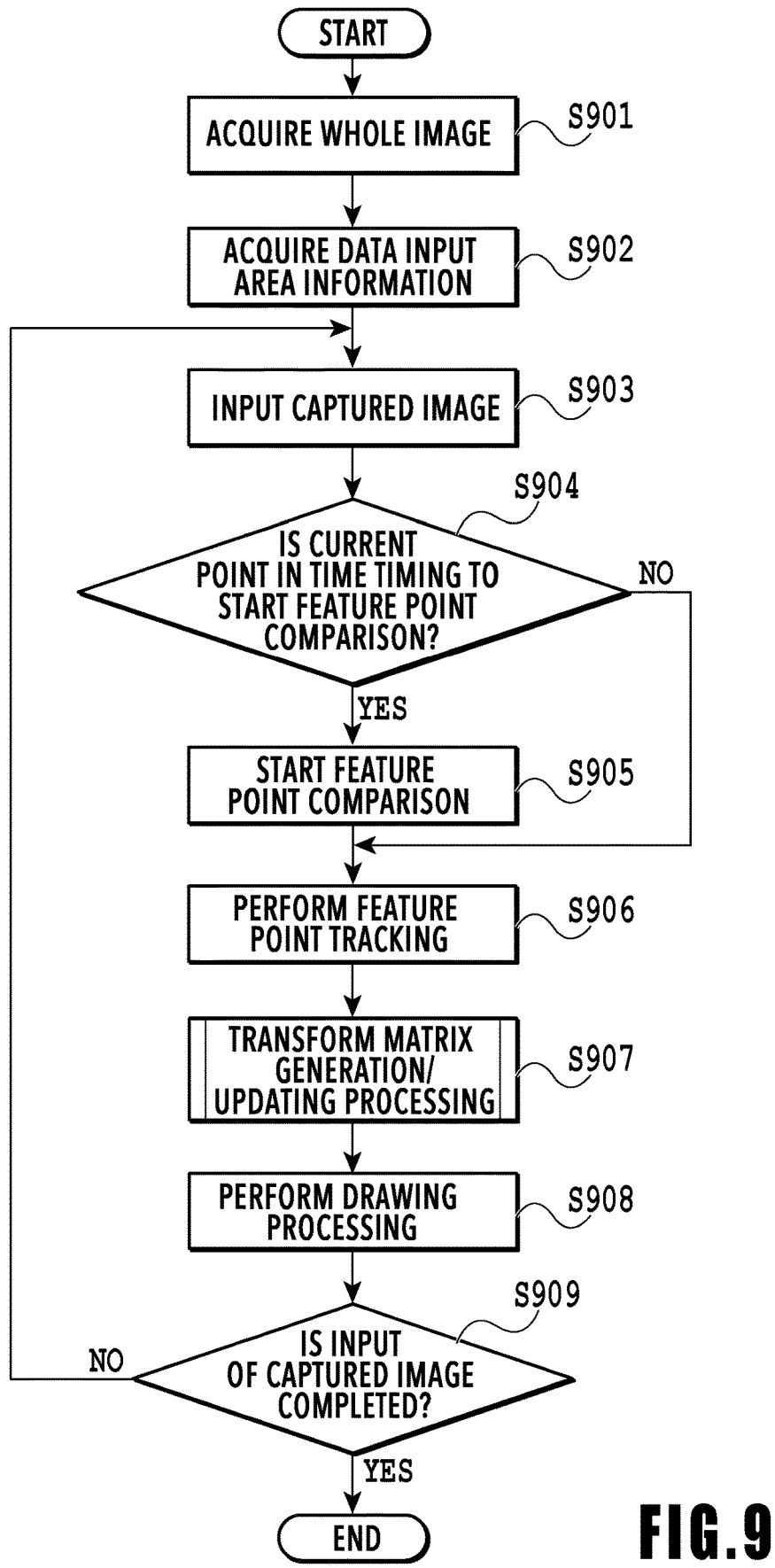
FIG. 9 is a flowchart showing an example of the tracking processing.

Next, the tracking processing implemented by the CPU 201 of the mobile terminal 100 executing the mobile application 302 is explained by using FIG. 9. For example, in a case where a user boots the mobile application 302 by operating the mobile terminal 100 and further starts image capturing by putting the camera 102 close to the object 103, the flow shown in FIG. 9 is started.

At step S901 (hereinafter, simply described as S901 and this is the same with other steps), the main control unit 303 transmits the whole image 500 saved in the DB unit 308 to the storage unit 307 and makes the whole image 500 usable. At S902, the main control unit 303 transmits the area information table 601 saved in the DB unit 308 to the storage unit 307 and makes the area information table 601 usable. At S903, the main control unit 303 commands the image acquisition unit 306 to acquire the image in the most recent frame of a moving image, corresponding to one image (one frame), as a captured image.

At S904, the main control unit 303 determines whether the current point in time is the timing to start the feature point comparison processing. In the present embodiment, the main control unit 303 determines the timing at which the tracking path between the whole image and the most recent capture image is established to be the timing to start the feature point comparison processing. For example, in a case where the image input in the processing at S903 is the image in the first frame (captured image A), it is determined that the tracking path between the whole image and the most recent capture image is established. It may also be possible for the feature point comparison processing to be started after the tracking path is established and then several frames are captured. Further, in the present embodiment, the determination at S904 is performed so that the feature point comparison processing is started periodically. That is, the main control unit 303 determines that the current point in time is the timing to start the feature point comparison processing periodically (for example, every predetermined number of frames, every predetermined periods).

In a case where the current point in time is not the timing to start the feature point comparison processing (No S904), the processing advances to S906 and in a case where the current point in time is the timing to start the processing (Yes at S904), the processing advances to S905. At S905, the main control unit 303 instructs the feature point comparison unit 310 to start the feature point comparison processing.

At S906, the main control unit 303 instructs the feature point tracking unit 311 to perform the feature point tracking processing between the input most recent captured image and the captured image input immediately previously. Further, the main control unit 303 commands the coordinate transform unit 312 to generate a transform matrix based on the results of the feature point tracking processing. At this time, as described previously, the coordinate transform unit 312 generates a transform matrix based on the coordinates of a plurality feature points associated with each other by the feature point comparison unit 310 between the most recent captured image and the immediately previous captured image, which are comparison targets. The transform matrix generated at this time is the transform matrixes A→B, B→C, C→D, D→E, E→F, and F→G in FIG. 7 and the transform matrixes E'→F' and F'→G' in FIG. 8.

At S907, the main control unit 303 performs transform matrix generation/updating processing, to be described later, and generates and updates a transform matrix. At S908, the main control unit 303 maps the OCR processing-target area onto the captured image by using the transform matrix generated at S907 and the area information table 601 stored in the storage 307. Then, the main control unit 303 outputs information for displaying the captured image onto which the OCR processing-target area is mapped to the mobile terminal screen 400 via the information display unit 304. In this manner, the main control unit 303 displays the OCR processing-target area on the mobile terminal screen 400 as a guide. In a case where a transform matrix is not generated at S907 after the captured image is input, the captured image onto which the OCR processing-target area is not mapped is displayed on the mobile terminal screen 400 as it is. At S909, the main control unit 303 determines whether the input of the captured image by the image acquisition unit 306 is completed. In a case where the input of the captured image continues (No at S909), the processing returns to S903. Due to this, the processing at S903 to S908 is performed repeatedly for the captured images sequentially input. On the other hand, in a case where the input of the captured image is completed (Yes at S909), the processing is terminated.

<Detailed Flow of Transform Matrix Creation/Updating Processing (S907)>

Figure 10B:
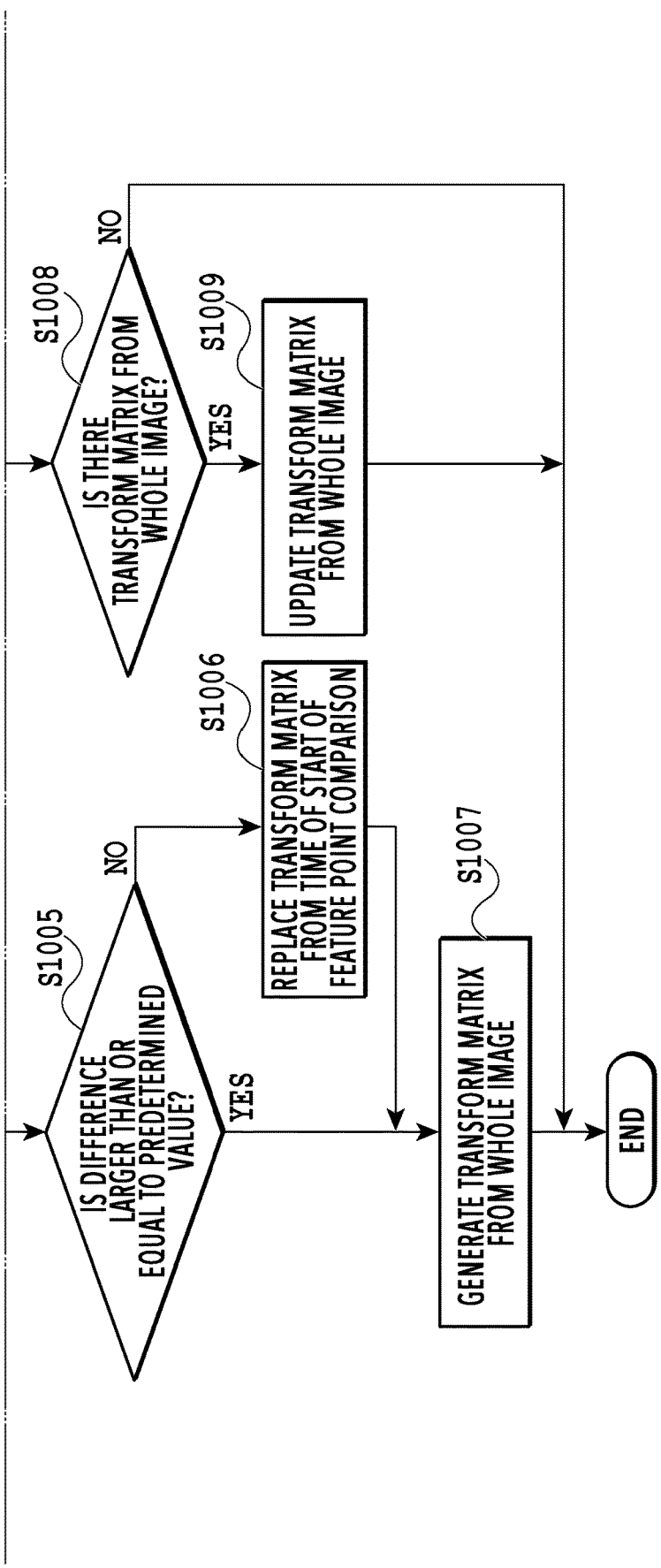
FIG. 10B is a flowchart showing an example of transform matrix generation/updating processing.

Next, details of the processing (transform matrix creation/updating processing) at S907 shown in FIG. 9 are explained by using FIG. 10A and FIG. 10B.

At S1001, the main control unit 303 determines whether the feature point comparison processing by the feature point comparison unit 310 is started. In a case where the feature point comparison processing is not started (No at S1001), the processing advances to S1004 and in a case where the processing is started (Yes at S1001), the processing advances to S1002. At S1002, the main control unit 303 determines whether or not the transform matrix (transform matrixes A→B, A→C, A→D, A→E shown in FIG. 7) between the captured image (feature point comparison image) used for the feature point comparison and the captured image input immediately previously exists. Hereinafter, this matrix is called the transform matrix from the time of start of feature point comparison. In a case where the transform matrix from the time of start of feature point comparison exists (Yes at S1002), the processing advances to S1004 and in a case where the transform matrix does not exist (No at S1002), the processing advances to S1003.

At S1003, the main control unit 303 instructs the coordinate transform unit 312 to generate a transform matrix between the feature point comparison image and the most recent captured image. Then, the coordinate transform unit 312 multiplies the transform matrix (transform matrixes A→B, A→C, A→D in FIG. 7) between the feature point comparison image and the captured image input immediately previously by the transform matrix (transform matrixes B→C, C→D, D→E in FIG. 7) generated at S906. Due to this, the transform matrix from the time of start of feature point comparison (transform matrixes A→C, A→D, A→E in FIG. 7) is generated. At S1004, the main control unit 303 determines whether the feature point comparison processing by the feature point comparison unit 310 is completed. In a case where the feature point comparison processing is completed (Yes at S1004), the processing advances to S1005. On the other hand, in a case where the feature point comparison processing is not completed (No at S1004), the processing advances to S1008.

At S1005, the main control unit 303 instructs the change amount derivation unit 314 to find a distance and a difference in area between the areas in which the feature point comparison image and the most recent captured image are mapped, respectively, onto the plan coordinate system of the whole image. Then, the main control unit 303 determines whether the found distance is larger than or equal to a predetermined distance and the found difference in area is larger than or equal to a predetermined difference. That is, the main control unit 303 determines whether a difference between the feature point comparison image and the most recent captured image is larger than or equal to a predetermined value. In a case where the found distance is larger than or equal to the predetermined distance and the found difference in area is larger than or equal to the predetermined difference (Yes at S1005), the processing advances to step S1007 and in a case where the found distance is not larger than or equal to the predetermined distance or the found difference in area is not larger than or equal to the predetermined difference (No at S1005), the processing advances to S1006.

At S1006, the main control unit 303 instructs the coordinate transform unit 312 to replace the transform matrix from the time of start of feature point comparison. Then, the coordinate transform unit 312 finds the transform matrix (transform matrix A→E' in FIG. 8) by taking the feature point comparison image and the most recent captured image as input images and by using the results obtained by performing the feature point tracking processing in the feature point tracking unit 311. Then, the coordinate transform unit 312 replaces the transform matrix from the time of start of feature point comparison (transform matrix A→E) generated at S1003 with the found transform matrix.

At S1007, the main control unit 303 instructs the coordinate transform unit 312 to generate a transform matrix between the whole image and the most recent captured image (hereinafter, represented as "transform matrix from the whole image"). Then, the coordinate transform unit 312 multiplies the transform matrix (transform matrix A→E in FIG. 7 or transform matrix A→E' in FIG. 8) generated at S1003 or S1006 by the transform matrix (transform matrix O→A in FIG. 7 and FIG. 8) generated by the feature point comparison processing. Due to this, the transform matrix from the whole image (transform matrix O→E in FIG. 7, transform matrix O→E' in FIG. 8) is generated. Then, the processing is terminated.

At S1008, the main control unit 303 determines whether the transform matrix (transform matrixes O→E, O→F, O→G in FIG. 7) between the whole image and the captured image input immediately previously is already generated. In a case where the transform matrix is generated (Yes at S1008), the processing advances to S1009 and in a case where the transform matrix is not generated (No at S1008), the processing is terminated.

At S1009, the main control unit 303 instructs the coordinate transform unit 312 to update the transform matrix between the whole image and the most recent captured image. Then, the coordinate transform unit 312 multiplies the transform matrix (transform matrixes O→E, O→F in FIG. 7) between the whole image and the captured image input immediately previously by the transform matrix (transform matrixes E→F, F→G in FIG. 7) generated at S906. Due to this, the transform matrix from the whole image (transform matrixes O→F, O→G in FIG. 7) is generated anew. Then, the processing is terminated.

As explained above, in the present embodiment, while the feature quantity comparison processing with the whole image is being performed, the tracking processing between the feature point comparison image and the most recent captured image is performed by repeating the feature quantity tracking. Then, at the point in time of completion of the feature quantity comparison with the whole image, the transform matrix found by the feature quantity comparison with the whole image and the transform matrix found by the tracking processing between the feature point comparison image and the most recent captured image are combined and thus the transform matrix between the whole image and the most recent captured image is found. Due to this, even while the camera is being moved, it is possible to reset the error of the accuracy of the transform matrix, and therefore, it is possible to improve the accuracy of the tracking processing. Consequently, it is possible to improve the operability at the time of performing enlarged image capturing of an OCR processing-target area.

Further, in the present embodiment, the feature quantity comparison processing with the whole image is performed periodically, and therefore, even in a case where the time of moving the camera lengthens, it is possible to suppress the error of the transform matrix from being accumulated. That is, irrespective of the length of the image capturing time of enlarged image capturing, it is possible to suppress the tracking error (position deviation).

Further, in the present embodiment, in a case where the image difference between the feature point comparison image and the most recent captured image is small at the point in time of completion of the feature quantity comparison with the whole image, the feature quantity tracking is performed by taking the feature point comparison image and the most recent captured image as inputs. Due to this, it is possible to perfectly reset the error of the accuracy of the transform matrix. Consequently, it is possible to further improve the operability at the time of performing enlarged image capturing of an OCR processing-target area.

As above, the embodiments of the present invention are explained, however, the present invention is not limited to those embodiments and it is possible to perform various kinds of modification and changes within the scope of the gist thereof.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to improve the accuracy of tracking processing for images in a plurality of frames.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-092340, filed May 11, 2018, which is hereby incorporated by reference wherein in its entirety.

What is claimed is:

1. An information processing apparatus comprising:
   a first derivation unit configured to derive, by performing a feature point comparison to compare a feature point extracted from a whole image obtained by capturing in advance the whole of an object and a feature point extracted from a first image obtained by capturing the object, first transform information used for coordinate transform between a coordinate system in the whole image and a coordinate system in the first image;
   a second derivation unit configured to derive, by performing a feature point tracking to track a position of a feature point extracted from the first image for a plurality of images input sequentially following the first image, second transform information used for coordinate transform between a coordinate system of the first image and a coordinate system of a second image of the plurality of images; and
   a third derivation unit configured to derive third transform information used for coordinate transform between a coordinate system in the whole image and a coordinate system in the second image by combining the first transform information and the second transform information.

2. The information processing apparatus according to claim 1, further comprising:
   an input unit configured to input an image obtained by performing moving image capturing of an object in units of frames, wherein
   the second derivation unit derives, from the first image being input to the input unit until the first transform information being derived by the first derivation unit, the second transform information by taking the image as the second image each time an image in a new frame is input to the input unit.

3. The information processing apparatus according to claim 2, wherein
   the third derivation unit derives, in a case where an image in a new frame is input to the input unit after driving the third transform information, transform information used for coordinate transform between a coordinate system of the image in the new frame and a coordinate system of an image in an immediately previous frame of the new frame and derives the new third transform information by using the transform information and the third transform information.

4. The information processing apparatus according to claim 2, further comprising:
   a difference derivation unit configured to derive a difference between the first image and the second image, wherein
   the second derivation unit derives, in a case where a difference derived by the difference derivation unit is not larger than or equal to a predetermined value, the second transform information by performing the feature point tracking for the first image and the second image.

5. The information processing apparatus according to claim 2, further comprising:
   a difference derivation unit configured to derive a different between the first image and the second image, wherein
   the second derivation unit derives, in a case where a difference derived by the derivation unit is larger than or equal to a predetermined value, the second transform information by performing the feature point tracking for an image in each frame from the first image to the second image.

6. The information processing apparatus according to claim 2, where
   the first derivation unit determines, in a case where an image in a new frame is input to the input unit, whether or not the current point in time is timing to start derivation of the first transform information and starts the feature point comparison in a case of determining that the current point in time is the timing.

7. The information processing apparatus according to claim 6, where
   the first derivation unit determines, in a case where images in a predetermined number of frames are input to the input unit after deriving the first transform information, that the current point in time is timing to start derivation of the new first transform information.

8. The information processing apparatus according to claim 1, further comprising:
   a drawing unit configured to map, based on area information representing a target area on an object, to which character recognition processing is applied, in a coordinate system in the whole image and the third transform information, the target area onto the second image; and
   an output unit configured to output information for displaying the second image onto which the target area is mapped on a display unit.

9. The information processing apparatus according to claim 1, wherein
   the object is a paper document in a predetermined format.

10. An information processing method comprising the steps of:

deriving, by performing a feature point comparison to compare a feature point extracted from a whole image obtained by capturing in advance the whole of an object and a feature point extracted from a first image obtained by capturing the object, first transform information used for coordinate transform between a coordinate system in the whole image and a coordinate system in the first image;

deriving, by performing a feature point tracking to track a position of a feature point extracted from the first image for a plurality of images input sequentially following the first image, second transform information used for coordinate transform between a coordinate system of the first image and a coordinate system of a second image of the plurality of images; and deriving third transform information used for coordinate transform between a coordinate system in the whole image and a coordinate system in the second image by combining the first transform information and the second transform information.

11. A non-transitory computer readable storage medium storing a program for causing a computer to perform an information processing method comprising the steps of:

deriving, by performing a feature point comparison to compare a feature point extracted from a whole image obtained by capturing in advance the whole of an object and a feature point extracted from a first image obtained by capturing the object, first transform information used for coordinate transform between a coordinate system in the whole image and a coordinate system in the first image;

deriving, by performing a feature point tracking to track a position of a feature point extracted from the first image for a plurality of images input sequentially following the first image, second transform information used for coordinate transform between a coordinate system of the first image and a coordinate system of a second image of the plurality of images; and deriving third transform information used for coordinate transform between a coordinate system in the whole image and a coordinate system in the second image by combining the first transform information and the second transform information.

* * * * *